No Printed Specification Available
8308X
E. Briggs,
Horse Power.
Patented July 12, 1834.
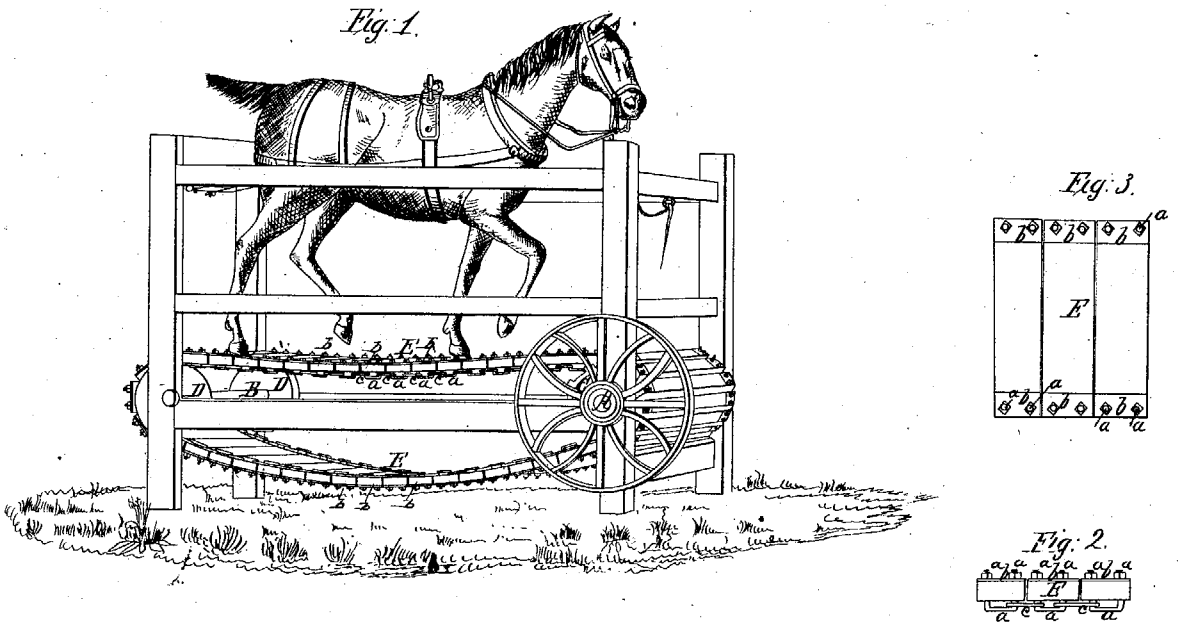
N. PETERS, PHOTO-LITHOGRAPHER, WASHINGTON, D. C.

8308X Eliakim Briggs.

Letters Patent.

The Schedule referred to in these Letters Patent and making part of the same, containing a description in the words of the said Eliakim Briggs, himself, of his improvement in propelling Machinery by horse power.

To all to whom these presents shall come.
Be it known that I Eliakim Briggs, of the town of Fort Covington in the County of Franklin and State of New York, have invented a new and useful improvement in the mode of propelling machinery by means of horse power, and that the following is a full and exact description of the construction and operation of the said Machine as invented by me. I construct a strong frame of timber of oblong figure of sufficient length to give the horse room to exercise his limbs freely in stepping within it, about eight feet long, more or less, the width sufficient to contain one or more horses abreast, as the case may require, and high enough to give room to the machinery herein after to be described or specified. Across this Machine or at right angles with the length thereof are two shafts of iron of sufficient strength to sustain the weight of the horse or horses together with all the strength the horses exert in propelling the machinery. One of these shafts may be called the driving, and the other the supporting shaft. The shafts are so con- str[illegible]cted and fitted as to turn in proper boxes, and the end of the driving shaft which projects from the one side of the frame, is the driving or main wheel which communicates the power either by a strap or by cogs. on the driving shaft are also two strong wheels of cast iron or other proper substance, say fifteen in diameter and about two inches in thickness, both more or less. the two wheels are situated immediately within the frame. on the inside of these two

8308X two Wheels are short cogs at equal distances, say six inches apart, more or less, as circumstances may direct. On the supporting shaft, which is near the back end of the frame, are also two wheels in each range with those on the driving shaft, and similar to them in diameter and thickness. But instead of Cogs on the surface, the wheels on the supporting shaft have each a flange or a groove, round on the edge, say half inch high more or less. The use of said flange is to keep the chain on the wheel; resting on the edge of these four wheels is a movable floor or platform for the horse to walk upon, and so constructed that instead of the horse moving forwards as he continues stepping, the floor goes back wards while the horse remains stationary, by which motion of the floor the said wheels, and consequently the machinery to be propelled, are set in motion. The mode of sustaining said floor and communicating its its motion to the driving shaft and thence to the Machinery, and which I hereby claim as constituting the main principle this my improvement is as follows — the said floor consists of planks of sufficient length to reach across the inside of the frame about six inches, more or less in width, and of sufficient thickness to give the necessary strength and durability. In each end of each of these planks, is inserted an iron staple, which staples are turned twice at right angles, and the two ends passing through the planks and through a plate of strong iron, with a nut on each end of the staple which holds the plate or cap firmly to the plank, thereby forming a staple of three inches, more or less, in length, and projecting clear of the plank about the diameter of the wire. By these staples the planks are connected together side by side with strong iron links, about three inches inside more or less, reaching from one staple to the other, and thereby forming with the staples, a complete chain at each end of the planks. The caps or plates on the ends of the staples, are as long as a staple and link, the ends meeting together when the chain is straight, which prevents the chain from swaging, forming a self supporting or arch chain — and this continuation of planks is extended so as to form an entire belt or band embracing both wheels within the said chain inside; and as the said chain

8308X chain passes over the said wheels, they are made to revolve and
with them the main propelling wheel which moves the Machinery,
and said staples as they project below the links, run in said grooves
in the edge of the said wheel and keeps the chain and planks steady
in their places. In witness that the foregoing is a true and correct
description of my said invention. I have hereunto set my hand
in Fort covington aforesaid, on the twenty fifth day of June,
in the year of our Lord one thousand eight hundred and
thirty four.

Witnesses
S. Congdon
G. S. Carpenter

Eliakim Briggs.

E.A.
W.H.

Drawing 910 words (Patented March 6. 1833.)